(No Model.)
M. McNEIL.
STEAM PRESSURE GAGE.
No. 486,839.      Patented Nov. 22, 1892.
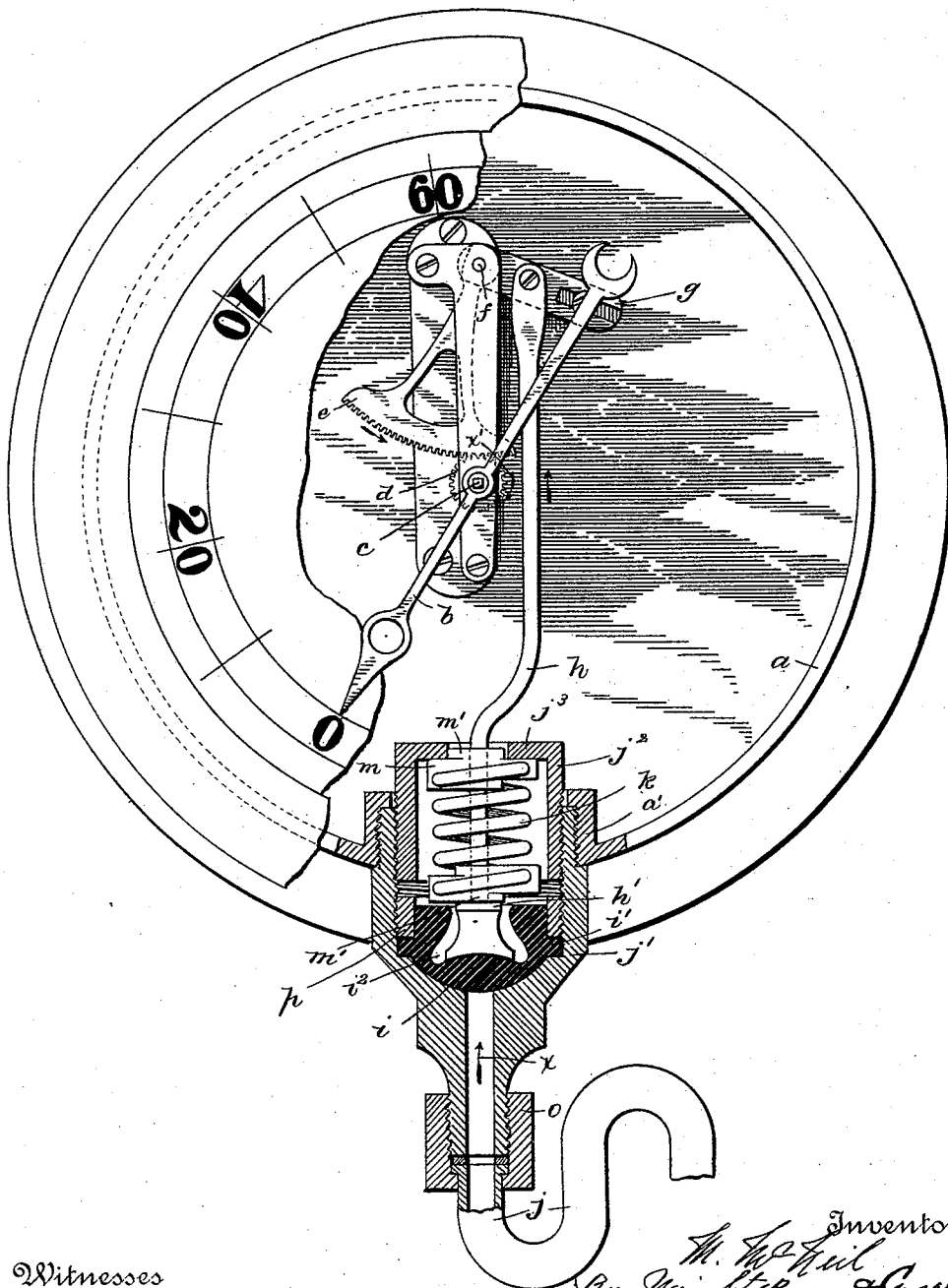
Witnesses
C. M. Sweeney
Wm. E. Knight
Inventor
M. McNeil
By Wright, Brown & Greeley attys
per H. I. Cushman
Associate Attorney

UNITED STATES PATENT OFFICE.

MURDOCK McNEIL, OF BOSTON, MASSACHUSETTS.

STEAM-PRESSURE GAGE.

SPECIFICATION forming part of Letters Patent No. 486,839, dated November 22, 1892.

Application filed January 30, 1892. Serial No. 419,839. (No model.)

*To all whom it may concern:*

Be it known that I, MURDOCK MCNEIL, of Boston, in the county of Suffolk and State of Massachusetts, have invented certain new and useful Improvements in Steam-Pressure Gages, of which the following is a specification.

This invention has for its object to provide a simple, durable, and efficient means for operating the movable finger or pointer of a steam-pressure gage; and it consists in the improvements which I will now proceed to describe.

The accompanying drawing, forming a part of this specification, represents a front view of a steam-gage provided with my improvements, a portion of the dial and front of the casing being broken away and a part of the construction being shown in section.

In the drawing, $a$ represents the casing of a steam-gage, and $b$ represents the pointer, which is affixed to a central arbor $c$, to which motion is imparted through a pinion $d$, affixed to said arbor, a rack-segment $e$, meshing with said pinion and pivoted at $f$ to a fixed support, an arm $g$, affixed to said rack-segment, a connecting-rod $h$, pivoted at one end to the arm $g$, and a flexible or elastic diaphragm $i$, which supports the opposite end of the connecting-rod $h$ and is arranged to receive pressure from water in the usual siphon-pipe $j$, connected with the casing $a$ and with the source of steam-supply, said siphon-pipe always containing a quantity of water, which is held by the steam-pressure against the diaphragm and prevents contact of the steam with the diaphragm.

The arrangement of the parts above described is such that pressure exerted in the direction indicated by the arrow $x$ against the diaphragm $i$ will move the rod $h$ in the same direction, and thus, through the arm $g$, rack-segment $e$, and pinion $d$, will move the pointer $b$ in the direction indicated by the arrow $x'$, the pointer being thus caused to indicate an increase of pressure. When the pressure decreases, a spring $k$, affixed at one end to a cross-piece $m$, which is loosely mounted on the rod $h$, and at its other end to a cross-piece $m'$, which is engaged with said rod by bearing upon a shoulder or collar $h'$ thereon, moves the rod in a direction opposite to that above described, and thus gives the pointer a backward movement over the dial.

The novel features of my invention are found in the diaphragm $i$, rod $h$, spring $k$, and in the means hereinafter described for supporting said diaphragm, rod, and spring, said diaphragm, rod, and spring being substituted for the usual Bourdon spring or tube.

The diaphragm $i$ is composed of yielding rubber or other suitable elastic material and is fitted in a socket or holder $j'$, which holder is of cylindrical form and is engaged with the casing $a$ by means of a screw-thread formed on its periphery, engaging an internal thread in a recess or socket $a'$, formed in said casing. The outer portion of the socket $j'$ is reduced and connected by a coupling $o$ or other suitable means with the siphon-pipe $j$. The diaphragm is formed to cover the passage extending through the reduced end of the holder $j'$ and is provided with a marginal flange $i'$, upon which bears a clamping or confining ring $p$, said ring being externally threaded and engaged with an internal screw-thread formed in the holder $j'$. The rod $h$ is provided with an enlarged head $h'$, which bears upon one side of the diaphragm, said head being preferably concave, while the corresponding surface of the diaphragm on which it bears is preferably convex. This form is adopted to prevent the rod from slipping laterally in contact with the diaphragm and to retain the rod in a central position. I prefer to extend the diaphragm upwardly upon the head of the rod, as shown, the diaphragm being virtually a rubber block provided with a recess $i^2$, formed to receive the head of the rod, and with a convex under surface fitting closely the bottom of the cavity in the socket or holder $j'$. It will be seen that the socket or holder, with the concave seat or surface to support the diaphragm, and the diaphragm formed with a convex under surface to rest on said seat and with a convex upper surface to support the concave head $h'$ of the rod $h$, said diaphragm being secured by its margin to the socket or holder, constitute a simple and durable means for supporting the rod $h$ and imparting to said rod the movements caused by variations of the steam-pressure. It will be observed that the diaphragm is thickened at the point where the pressure is exerted from it upon the rod, this form, together with the thinner portions surrounding the thickened central portion, giving the diaphragm the necessary flexibility, and at the same time a suitable strength and firmness.

$j^2$ represents a cylindrical cap which is externally screw-threaded and formed to engage the internal screw-thread of the casing or holder $j'$, said cap having a head $j^3$, which supports the cross-bar $m$ against the pressure of the spring $k$. The head $j^3$ has an orifice at its center, through which the rod $h$ passes, said orifice being preferably formed to receive a boss or projection $m'$ on the cross-bar $m$.

I claim—

In a steam-pressure gage, the combination of the casing, the holder $j'$, externally screw-threaded and engaged with an internally-threaded socket formed on the casing, the diaphragm secured at its margin in said casing and having a thickened central portion surrounded by a thinner and more flexible portion, said diaphragm presenting convex bottom and top surfaces, a pointer-operating rod having a head formed with a concave surface to bear upon the convex upper surface of the diaphragm, a spring arranged to force said head downwardly upon the diaphragm, and the adjustable cap supporting said spring, as set forth.

In testimony whereof I have signed my name to this specification, in the presence of two subscribing witnesses, this 16th day of January, A. D. 1892.

MURDOCK McNEIL.

Witnesses:
   C. F. BROWN,
   A. D. HARRISON.